Jan. 5, 1937. H. T. PLATZ 2,067,064
WELDING DEVICE
Filed Sept. 20, 1933 2 Sheets-Sheet 2
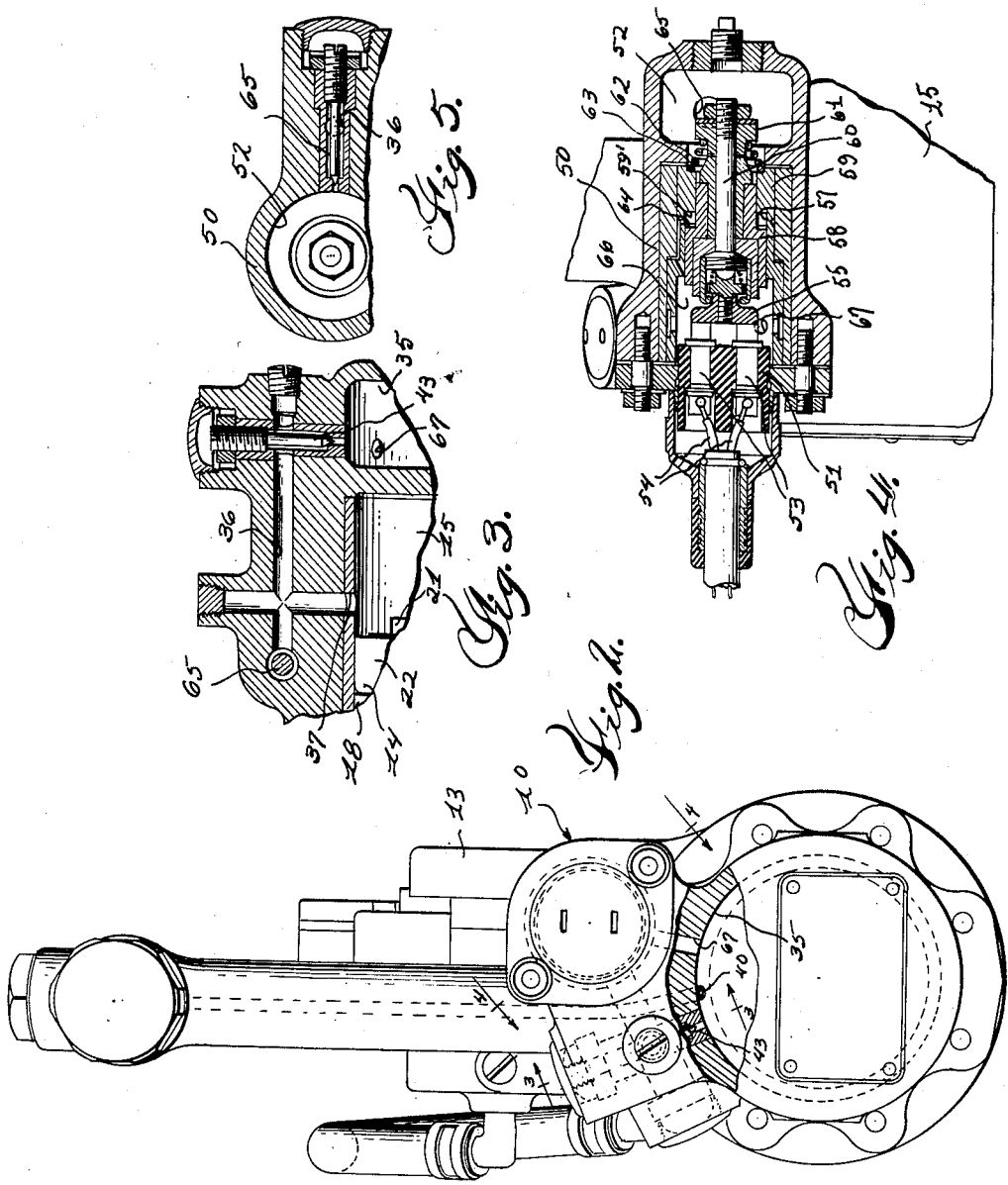
INVENTOR
Henry Thomas Platz
BY
Whittemore Hulbert Whittemore Belknap
ATTORNEYS Patented Jan. 5, 1937

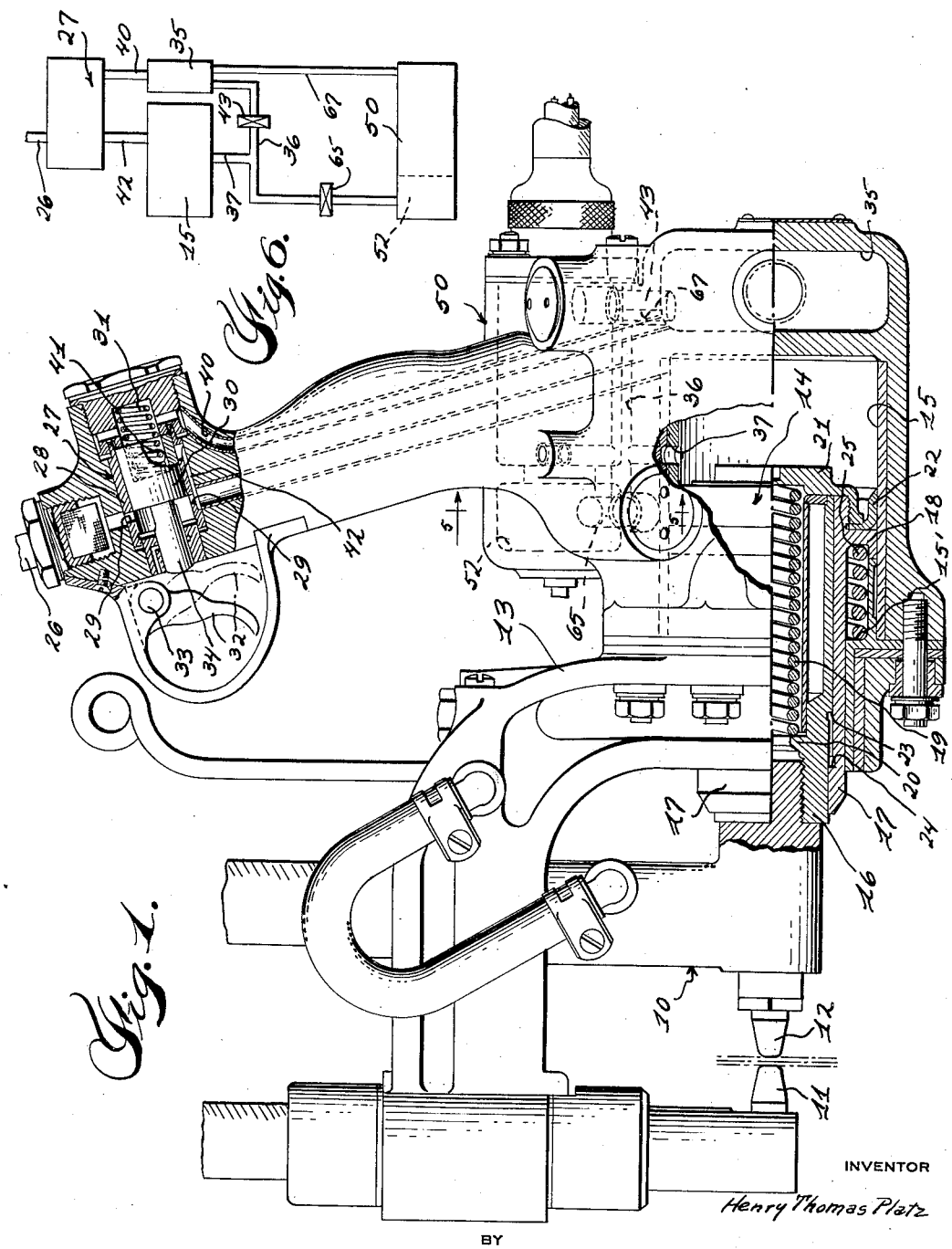

2,067,064

UNITED STATES PATENT OFFICE 2,067,064

WELDING DEVICE

Henry Thomas Platz, Detroit, Mich., assignor to Briggs Manufacturing Company, Detroit, Mich., a corporation of Michigan Application September 20, 1933, Serial No. 690,250

9 Claims. (Cl. 219—4)

This invention relates generally to welding apparatus and refers more particularly to improvements in welding apparatus of the type described in my copending application, Serial No. 476,127, filed August 18, 1930, since matured into Patent No. 1,954,426, dated April 10, 1934.

Among other features, the welding apparatus disclosed in the above identified pending application is provided with means for automatically closing the circuit to the electrodes of the apparatus in timed relation to relative movement of the electrodes into engagement with the work and for automatically opening the circuit to the electrodes to discontinue the weld after a predetermined interval of time has elapsed. As also pointed out in the copending application, provision is made for accurately controlling the operation of the above means to vary the interval of duration of the weld and to regulate the interval the electrodes are energized with reference to engagement of the same with the work. However, in the apparatus forming the subject matter of my copending application, the electrodes are maintained into engagement with the work during the welding operation by a manually controlled air valve which must be manually held in its operative position in order to retain the electrodes in engagement with the work.

It is, therefore, one of the principal objects of the present invention to improve welding apparatus of the type shown in my copending application by eliminating the necessity of manually holding the control valve for the electrodes in its operative position or, in other words, by providing means for automatically releasing the electrodes from engagement with the work in timed relation to the operation of the circuit controlling means to open the circuit to the electrodes.

The present invention contemplates other improvements in welding apparatus which will be made more apparent as this description proceeds, especially when considered in connection with the accompanying drawings, wherein:

Figure 1 is a longitudinal sectional view through welding apparatus constructed in accordance with this invention;

Figure 2 is an end elevation of the construction shown in Figure 1;

Figure 3 is a sectional view taken on the line 3—3 of Figure 2;

Figure 4 is a sectional view taken on the line 4—4 of Figure 2;

Figure 5 is a sectional view taken on the line 5—5 of Figure 1;

Figure 6 is a diagrammatic view of the control system.

Referring now to the drawings, it will be noted that there is illustrated in Figure 1 a welding device 10 comprising a pair of cooperating opposed relatively movable electrodes 11 and 12 supported in axial alignment with each other on the frame 13 of the device in any suitable manner. Both electrodes may be connected in an electric circuit in much the same manner as that shown in my copending application, and, in the present instance, the electrode 11 is fixedly supported upon the frame, while the electrode 12 is supported upon the frame for movement toward and away from the electrode 11.

In detail, the electrode 12 is detachably secured to a piston assembly 14 reciprocably mounted within a cylinder 15 and comprising an inner sleeve 16 having the outer end projecting beyond the cylinder for connection with the electrode 12. The inner sleeve telescopically engages an outer sleeve 17 which in turn is provided with an annular enlargement 18 at the inner end for slidably engaging the side walls of the piston. Located within the inner sleeve 16 is a coil spring 19 having the outer end engaging a fixed abutment 20 on the sleeve 16 and having the inner end abutting a suitable cap 21 which in turn is threadedly mounted upon the inner end of the sleeve 17. In this connection, it is to be noted that the cap 21, in addition to forming an abutment for the spring 19 and closing the inner ends of both sleeves, also cooperates with the enlargement 18 on the outer sleeve to secure the usual cup-shaped piston washer 22 in place. The spring 19 normally tends to slide the inner sleeve relative to the outer sleeve in a direction to move the electrode 12 toward the electrode 11, and, in the present instance, the extent of relative movement between the two sleeves is restricted by means of the cooperating engaging stops or shoulders 23 and 24 respectively on the inner sleeve 16 and outer sleeve 17. This latter construction is desirable, since it, obviously, provides for interposing work of various thicknesses between the electrodes without adjusting or otherwise interfering with the apparatus.

As shown particularly in Figure 1, a second spring 25 is provided for disengaging the electrode from the work through the intermediary of the cooperating engaging shoulders 23 and 24. The spring 25 is shown as surrounding the outer sleeve 17 with the inner end engaging the enlargement 18 and with the outer end engaging an abutment 15' fixed to the corresponding end of the cylinder 15.

Movement of the outer sleeve 17 in a direction to engage the electrode 12 with the work is effected herein by admitting fluid pressure into the cylinder 15 in rear of the cap 21 or piston assembly 14. In this connection, it is to be noted from Figure 1 that a fluid supply line 26 communicates with the inner end of the cylinder 15 through the medium of a piston type valve 27 arranged within the fluid supply line. In detail, the valve 27 comprises a cylinder 28 having passages 29 in opposite sides thereof registering with the fluid supply passage and having a piston 30 reciprocably mounted therein for controlling the flow of fluid from the source of supply to the cylinder. The piston 30 is of such length that when the same is in its innermost position shown in Figure 1, communication is established through the line 26 to the cylinder 15, and when in its outermost position, communication through the aforesaid line is closed thereby. The piston 30 is normally urged to its outermost position by means of a spring 31 having one end engaging the piston and the opposite end engaging a removable plug attached to the frame of the device. Movement of the piston against the action of the spring to open communication from the source of supply to the cylinder is accomplished herein by means of a trigger 32 pivotally supported as at 33 for engagement with a reduced extension 34 projecting from the piston beyond the cylinder. The arrangement is such that movement of the trigger 32 in an inward direction transmits a corresponding movement to the piston 30 through the medium of the extension 34 against the action of the spring 31 to open communication between the source of supply and cylinder 15. The manual force exerted upon the trigger to effect the above operation of the piston may then be released, since the fluid under pressure flowing from the source of supply to the cylinder is sufficient to maintain the piston in its innermost position against the action of the spring 31. The fluid under pressure flowing past the outer side of the valve piston 30 is admitted to the cylinder 15 upon the inner side of the piston assembly, and as soon as the pressure exceeds the force exerted upon the opposite side of this assembly by the spring 25, the sleeve 17 will move in a direction to engage the electrode 12 with the work. Continued movement of the sleeve 17 in the aforesaid direction causes the spring 19 to compress in the manner previously discussed to yieldably engage the electrode with the work.

As indicated above, the spring 31 acting upon the valve piston 30 is not of sufficient strength to move this piston against the action of the fluid pressure flowing through the cylinder past the outer side thereof, and in order to accomplish this result automatically, I provide means for building up a pressure upon the inner side of the piston 30 to assist the spring 31 in closing the valve. In addition, I provide means for controlling the flow of fluid pressure to the cylinder upon the inner side of the piston 30 so as to permit regulating the interval of operation of the valve to close communication between the source of supply and cylinder 15. The foregoing is accomplished herein in the following manner. A chamber 35 is formed in the frame in rear of the cylinder 15 and communicates with the latter by means of a passage 36. The point of communication 37 between the passage 36 and cylinder 15 is carefully predetermined so that in the normal or initial position of the piston assembly 14, communication between the cylinder 15 and passage is closed by the piston assembly and remains closed until the latter approaches a position wherein the electrode engages the work. However, as soon as the point of communication 37 is uncovered by the piston assembly, fluid pressure from the cylinder 15 will flow through the passage 36 into the accumulating chamber 35 which in turn also communicates with the interior of the cylinder 28 at the inner side of the piston therein through the medium of a passage 40. The arrangement is such that as the fluid pressure at the inner side of the piston 30 plus the force of the spring 31 exceeds the pressure of fluid passing by the outer side of the piston 30, the latter is moved outwardly closing communication between the source of supply and cylinder 15. In order to provide for reducing the pressure in the cylinder 15 at the inner side of the piston upon closing communication through the supply line 26 by the piston valve, a suitable exhaust port 41 is formed in one side of the cylinder 28 in communication with the supply line to the cylinder 15 through the medium of a lateral passage 42 closed by the piston when in its operative position shown in Figure 1. The exhaust port 41 is so located with reference to the stroke of the piston 30 that when the latter closes the supply line 26, communication is also established between the exhaust port and accumulating chamber 35 through the medium of the passage 40 so as to permit exhausting the fluid under pressure in the latter chamber as well as the fluid pressure in the cylinder 15.

Reference has been briefly made in the foregoing description of means for regulating the length of time the electrode 12 is maintained into engagement with the work, and this is accomplished in the present instance by controlling the flow of fluid under pressure from the accumulating chamber to the valve cylinder through the medium of a metering or needle valve 43 located in the passage 36 leading from the cylinder 15 to the accumulating chamber 35. The needle valve 43 is clearly shown in Figure 3 and is located in a position where it may be readily adjusted for the purpose set forth above. Obviously, adjustment of the valve to vary the rate of flow of fluid under pressure into the accumulating chamber varies the time required to build up sufficient pressure in the valve cylinder to move the piston 30 to its closed position, and, as a consequence, correspondingly varies the length of time the electrode is maintained into engagement with the work.

The fluid pressure in the accumulating chamber 35, in addition to automatically effecting a return movement of the electrode 12 by closing the piston valve 27, also functions to automatically open the circuit to the electrodes in timed relation to withdrawal of the electrode 12. Before discussing the manner in which the foregoing is accomplished, the switch for controlling the circuit to the electrodes will be described. This switch is shown particularly in Figure 4 as comprising a casing 50 having a stationary contact block 51 secured to the open end thereof and having a chamber 52 adjacent the opposite end of the same. The contact block 51 is provided with a pair of stationary contacts 53 connected in the circuit to the electrodes by means of the conductors 54 in such a manner that bridging the contacts 53 closes the circuit to the electrodes. In the present instance, the contacts 53 are bridged by a contact member 55 connected to a piston assembly 57 for movement longitudinally of the casing 50 toward and away from the stationary contacts. The piston assembly comprises a sleeve 58 connected at the outer end to the contact member 55 and slidably mounted within a bushing 59 fixed in the casing 50. Extending axially through the sleeve 57 and movable as a unit therewith is a plunger 60 having an enlargement 61 on the inner end extending into the chamber 52. The plunger 60 and, accordingly, the movable contacts 55 are normally urged in a direction away from the stationary contacts 53 by means of a coil spring 62 encircling the plunger in the manner shown in Figure 4. The inner end of the coil spring 62 engages the enlargement 61, while the outer end of the spring abuts a shoulder 63 formed by the outer end of the fixed sleeve 59. The extent of movement of the contacts 55 in a direction away from the stationary contacts is restricted in the present instance by a shoulder 64 formed on the slidable sleeve 58 and a cooperating engaging shoulder 59' formed on the fixed sleeve 59.

The switch previously described is actuated by fluid pressure, and in order to provide for moving the piston assembly in a direction to bridge the stationary contacts 53, communication is established between the chamber 52 and interior of the cylinder 15 through the medium of the passage 36. In order to determine the interval of closing of the switch in relation to engagement of the electrode 12 with the work, a needle valve assembly 65 is interposed in the line of communication between the cylinder 15 and chamber 52. The needle valve assembly 65 may be the same as the valve 43 hereinbefore described in that adjustment of the valve is permitted to regulate the rate of flow of fluid under pressure admitted to the chamber 52 at the inner side of the piston assembly. However, as soon as the fluid pressure in the chamber 52 exceeds the force exerted by the spring 62, the contact member 55 engages the stationary contacts 53 to close the circuit to the electrodes.

Fluid pressure is also employed for automatically opening the circuit to the electrodes or, in other words, for moving the contact member 55 in a direction away from the cooperating stationary contacts 53. This is accomplished in the present instance by establishing communication between the space 66 in advance of the piston assembly 57 and the interior of the accumulating chamber 35 through the medium of a passage 67. The arrangement is such that as the pressure of the fluid discharged from the accumulating chamber into the space 66 approaches the fluid pressure in the chamber 52, the spring 62 automatically effects the desired movement of the contacts 55 away from the stationary contacts 53 in a manner previously set forth.

Inasmuch as the fluid pressure in the accumulating chamber is employed for disengaging the electrode from the work through the medium of the piston valve 27 and for opening the circuit to the electrodes, and in view of the fact that the valve 43 regulates the rate at which pressure in the accumulating chamber is built up, it will be apparent that the desired timing between opening of the circuit to the electrodes and disengagement of the latter from the work is realized. In other words, the valve 43, in addition to regulating the flow of fluid pressure to the piston valve 27 for closing the same, also regulates the fluid pressure discharged into the switch casing for opening the circuit to the electrodes so that if desired, both of these functions may be accomplished simultaneously.

Operation

The foregoing construction will perhaps be more readily apparent upon viewing the diagram shown in Figure 6 wherein it will be seen that fluid pressure is admitted to the cylinder 15 through the piston valve assembly 27 in such a manner that manual movement of the piston to its innermost position opens communication to the cylinder 15 for moving the electrode 12 into engagement with the work. It will also be observed from the above diagram that at a predetermined point in the travel of the electrode 12 toward the work, fluid pressure is admitted to the switch chamber 52 through the valve 65 for actuating the switch to close the circuit to the electrodes. The fluid pressure discharged from the cylinder 15 through the passage 37, in addition to flowing through the valve 65 to the switch chamber 52, also flows through the valve 43 into the accumulating chamber 35 and from the latter to the low pressure sides of the piston valve 27 and switch plunger 60 for respectively disengaging the electrodes from the work and opening the circuit to the electrodes when the pressure in the accumulating chamber exceeds a predetermined amount.

What I claim as my invention is:

1. An electric welding machine comprising electrodes relatively movable toward and away from each other, a switch for controlling an electric circuit to said said electrodes, fluid pressure means operable upon a predetermined movement of one of said electrodes for automatically actuating said switch to close the circuit to the electrodes, and fluid pressure means for automatically operating the switch to open the circuit to the electrodes after a predetermined interval of operation of the latter and for automatically effecting relative movement of the electrodes in a direction away from each other.

2. An electric welding machine comprising an electrode movable into and out of engagement with the work to be welded, means operatively connected to the electrode for actuating the same, a switch for controlling an electric circuit to the electrode, fluid pressure operated means for actuating the switch to close the circuit to the electrode in timed relation to movement of the same into engagement with the work, means also operated by fluid pressure for automatically actuating the switch to open the circuit to the electrode, additional means operated by fluid pressure in timed relation to said switch opening means for automatically effecting movement of the electrode in a direction away from the work, and common means for regulating the flow of fluid under pressure to both the switch opening means and last named means to vary the length of the welding period.

3. In an electric welding machine, a cylinder, a piston in said cylinder, a movable electrode operatively connected to said piston, a valve controlling the flow of fluid under pressure to said cylinder, a fluid pressure operated switch for closing an electric circuit to said electrode, fluid pressure means for actuating the switch to open the circuit and for closing said valve to permit movement of the piston in a direction to disengage the electrode from the work, and means for metering the flow of fluid pressure to said last named means.

4. In a welding machine, a cylinder, a piston in said cylinder, a movable electrode operatively connected to said piston, a valve controlling the flow of fluid under pressure to said cylinder, a fluid pressure operated switch for closing an electric circuit to said electrode, fluid pressure means communicating with the cylinder and operable to actuate the switch to open the circuit to the electrode and to close the valve, and means for metering the flow of fluid pressure from the cylinder to said means.

5. In an electric welding machine, a cylinder, a piston in said cylinder, a movable electrode operatively connected to said piston, means for controlling the flow of fluid under pressure to said cylinder including a valve having a piston movable in one direction to admit fluid under pressure to the cylinder and movable in the opposite direction to close said communication, a passage providing communication between the cylinder and the valve for moving the piston in a direction to close communication to the cylinder, means in said passage for metering the flow of fluid therethrough to regulate the interval of operation of the piston to close communication to the cylinder, a fluid pressure actuated switch for closing an electric circuit to said electrode, and fluid pressure means for actuating said switch to open the circuit including a passage communicating with the passage aforesaid at such a point that the rate of flow of the fluid pressure therein is also controlled by said metering means.

6. In an electric welding machine, a cylinder, a piston in said cylinder, a movable electrode operatively connected to said piston, a valve controlling the flow of fluid under pressure to said cylinder, fluid pressure means for operating said valve to close communication to the cylinder, a fluid pressure actuated switch for closing an electric circuit to said electrode and fluid pressure means for operating said switch to open the circuit in timed relation to the actuation of the valve to close communication to the cylinder.

7. In an electric welding machine, a cylinder, a piston in said cylinder, a movable electrode operatively connected to said piston, a valve controlling the flow of fluid under pressure to said cylinder having a valve member actuated by fluid under pressure to close communication to the cylinder, a switch for controlling an electric circuit to said electrode, fluid pressure means rendered operative by said piston upon a predetermined movement thereof for actuating the switch to close the circuit to the electrode, fluid pressure means for actuating the switch to open the circuit to the electrode and to move the valve member into a position to close communication to the cylinder, means for regulating the interval of closing of said switch in relation to movement of the piston, and means independent of said last named means for regulating the interval of operation of said valve to close communication to the cylinder and for regulating the interval of operation of the switch to open said circuit.

8. In an electric welding machine, a cylinder, a piston in said cylinder, a movable electrode operatively connected to said piston, means for controlling the flow of fluid under pressure to said cylinder including a valve having a piston movable in one direction to admit fluid under pressure to the cylinder and movable in the opposite direction to close communication to said cylinder, a passage providing communication between the cylinder and valve for moving said piston in a direction to close communication to the cylinder, and means in said passage for metering the flow of fluid therethrough to regulate the interval of operation of the piston to close communication to the cylinder.

9. In an electric welding machine, a cylinder, a piston in said cylinder, a movable electrode operatively connected to said piston, a fluid pressure operated valve controlling the flow of fluid pressure to the cylinder, a switch for controlling an electric circuit to said electrode, and fluid pressure means controlled by movement of said piston for actuating said switch to close and open the circuit to the electrode in timed relation to the operation of said valve.

HENRY THOMAS PLATZ.